United States Patent [19]

Kühl

[11] 4,327,165

[45] Apr. 27, 1982

[54] SEAL FOR GALVANIC ELEMENT

[75] Inventor: Thomas Kühl, Eppstein, Fed. Rep. of Germany

[73] Assignee: Varta Batterie Aktiengesellschaft, Hanover, Fed. Rep. of Germany

[21] Appl. No.: 176,268

[22] Filed: Aug. 8, 1980

[30] Foreign Application Priority Data

Sep. 12, 1979 [DE] Fed. Rep. of Germany ....... 2936781

[51] Int. Cl.³ ............................................. H01M 2/08
[52] U.S. Cl. ...................................... 429/174; 429/185
[58] Field of Search ........................ 429/174, 171–173, 429/164–170, 185

[56] References Cited

U.S. PATENT DOCUMENTS 3,421,945 1/1969 Michalko .......................... 429/17 X

*Primary Examiner*—Charles F. Lefevour
*Attorney, Agent, or Firm*—Weiser, Stapler & Spivak

[57] ABSTRACT

The seal for the housing of a galvanic element, which has rotationally symmetrical housing portions is produced by a shrink fit provided through thermal expansion between the cup and the lid portions. This is produced by uniting with each other, in a crimping device, the housing cup using a heated die and upper ram, and a cooled housing lid which has been cooled by means of a cooled ejector.

4 Claims, 2 Drawing Figures

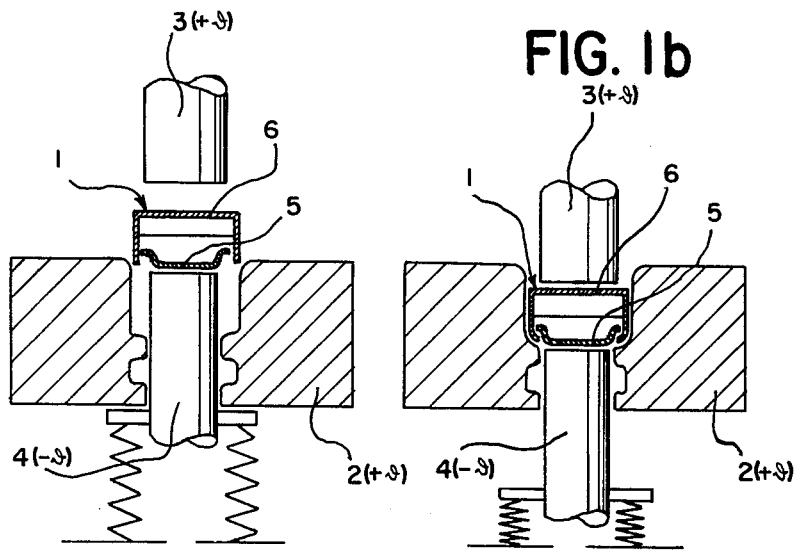
FIG. 1a
FIG. 1b
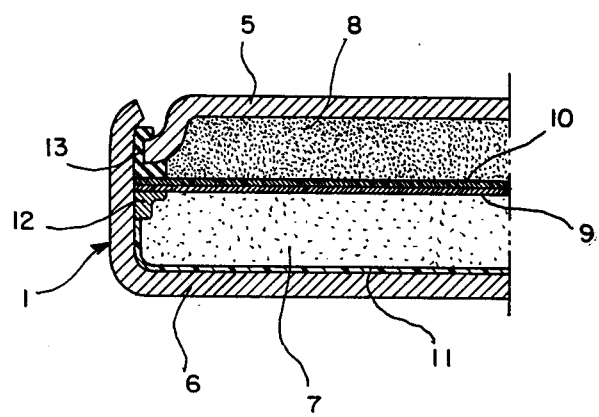
FIG. 2

SEAL FOR GALVANIC ELEMENT

The invention relates to a galvanic element having a housing containing the active components which is rotationally symmetrical and which is tightly sealed between the cup portion and the lid portion. In particular, cylindrical and button cells are within the scope of the invention.

Cells of this type always have two housing portions: the housing cup with the actual, electrochemically active contents of the cell, and the housing lid. The two are sealed tightly through crimping along a synthetic plastic seal which unites and encircles the two housing portions. This crimping constitutes the final step in the manufacture of the cell. If appropriate, the sealing of the cell can also be accomplished by pinching of the housing portions which fit within each other, or the like.

What all those methods which rely upon compression in the sealing region have in common with crimping is that, after the crimping has taken place, reverse spring effects take place which are unavoidable as a reaction to the removal of the external compression force. They manifest themselves in that a compressive force which may be produced within the housing cup for example, is transformed through expansion into a pulling force. In addition, the conventional crimping technique is very sensitive to tolerances attributable to volume displacement effects, as a result of which quasi-hydrostatic pressure is created in the sealing region.

Accordingly, it is an object of the invention to provide a closure technique for galvanic elements having housing portions which are rotationally symmetrical, in which a relaxation of the closing force resulting from force-transforming after-effects are largely averted.

This and other objects which will appear are achieved in accordance with the invention by tightly uniting the cup portion and the lid portion by a shrink fit which is produced through thermal expansion.

As the housing material, highly ductile metals having a high thermal expansion coefficient are particularly suitable, for example copper-beryllium alloys, iron, brass, and nickel-iron alloys.

The shrinking-on of one housing portion upon the other is triggered by a pre-heating of the cup to 65° C., for example, and a pre-cooling of the lid to −35° C., for example. In that state, the components just touch in the radial direction. The choice of the temperatures is limited only by the requirement that the electrodes and separator material which were previously built-in must not be damaged.

The closing operation must take place so quickly that the sealing material, which is positioned within one of the housing portions, substantially maintains its prior temperature, i.e. does not significantly increase or reduce its temperature.

It is also possible to heat or to cool only one housing portion while leaving the other housing portion at the ambient temperature and then to join the portions together. Preferably, that housing portion which is provided with the seal is maintained at the ambient temperature.

In a galvanic element embodying the invention a separate sealing element is not necessary. However, it is preferable to thinly coat with a sealing mass the rim of the lid and the interior of the cup or at least one of these, in the sealing region. This is so that this sealing material, due to its poor coefficient of heat conductivity will prevent heat exchange between the housing portions. The sealing material itself should be maintained at approximately the ambient temperature. By leaving out a separate structural sealing member, there is further achieved better utilization of the interior space. The thickness of such a sealing layer is between about 0.1 and 0.2 mm.

As the tool for producing a galvanic element with housing portions which are sealed through shrink-fit in accordance with the invention, there may be used an arrangement such as is also used for conventional crimping. However, this is modified by making the die and the upper ram so that they can be heated, whereas the lower ram or ejector is made so that it can be cooled. Conventional crimping technology is used to the extent that the apparatus involved causes the housing portions which are to be joined to assume positions in which they just touch in their radial direction, or are even subject to a certain amount of initial compressive force.

For further details, reference is made to the discussion which follows in light of the accompanying drawings wherein FIGS. 1a and 1b diagrammatically illustrate the apparatus for producing galvanic elements in accordance with the invention at two different stages of operation; and FIG. 2 shows a fragmentary cross-section through a galvanic element embodying the invention.

Referring to FIG. 1a, this shows the cell 1 which has been fully assembled and also filled with electrolyte, within the tool which consists of die 2, upper ram 3 and lower ram (ejector) 4. It is so positioned that the lid 5 rests upon the cooled lower ram and approximately assumes its temperature ($-\theta$).

Upon operation of the upper ram the cell cup 6 becomes heated to approximately the temperature ($+\theta$) of the heated die 2 and the upper ram, through contact with same. At the operating stage shown in FIG. 1b, the state of thermal crimping is achieved. After ejection, there exists the tight seal in accordance with the invention between the housing portions, as a result of the temperature equalization through shrinking of the cup as well as through radial expansion of the pre-cooled lid.

The galvanic element, sealed in accordance with the invention as shown in FIG. 2 may, for example, be an AgO/Zn button cell having a positive AgO electrode 7, and negative Zn electrode 8, between which there is the separator 9 as well as an electrolyte-absorbing sheet 10. The inner coating 11 of cup 6 with polytetrafluoroethylene, and the contact ring 12 correspond to conventional cell arrangements. On the other hand, the synthetic plastic seal member which is otherwise present is here replaced by a narrow insulating strip 13 of a sealing mass.

To estimate the forces which arise during shrinking, there is provided the following example, which is based upon the idealized case of two thin tubes, positioned within each other so that circumferential forces arise.

The tubes, i.e. housing portions, may be made, for example, of steel or nickel, having a linear coefficient of expansion of about $13.0 \times 10^{-6}$ per °K. For a temperature difference of, e.g. $\Delta\theta = 100°$ K. there results a relative expansion of $100 \times 13 \times 10^{-6} = 1.3 \times 10^{-3}$. Per unit, this corresponds to a relative expansion of $0.5 \times 1.3 \times 10^{-3}$ which corresponds to a force in the circumferential direction of approximately $\theta_T = X \cdot E = 0.5 \times 1.3 \times 10^{-3} \times 20 \times 10^3 = 13$ kp/mm², when a modulus of elasticity E of $20 \times 10^3$ kp/mm² is assumed.

As this example shows, the metal portions can be loaded to the limit of their elastic properties through the temperature differences which can be provided in the crimping tool.

I claim:

1. A galvanic element having a rotationally symmetrical housing comprising a cup portion and a lid portion within which the active elements are contained and which is tightly sealed, said cup portion and lid portion being tightly united through a shrink force which is produced by initially bringing said portions to substantially different temperatures, and then permitting the temperatures to equalize.

2. The element of claim 1 wherein the housing portions are made of a highly ductile material having a high thermal coefficient of expansion.

3. The element of claim 1 wherein the lid portion and the interior of the cup portion in the sealing region are provided with a thin layer of a sealing mass.

4. The element of claim 1 wherein the lid or the interior of the cup portion in the sealing region is provided with a thin layer of a sealing mass.

* * * * *